United States Patent [19]
Hasegawa

[11] 3,935,957
[45] Feb. 3, 1976

[54] INSULATION FOR DOUBLE WALLED CRYOGENIC STORAGE TANK

[75] Inventor: Tsutomu Hasegawa, Noda, Japan

[73] Assignee: Kawasaki Jukogyo Kabushiki Kaisha, Kobe, Japan

[22] Filed: Apr. 9, 1974

[21] Appl. No.: 459,443

[30] Foreign Application Priority Data
Apr. 10, 1973 Japan.............................. 48-40012
Apr. 24, 1973 Japan.............................. 48-45721
Aug. 28, 1973 Japan.............................. 48-95703

[52] U.S. Cl. ............................ 220/9 LG; 220/15
[51] Int. Cl.² ................ B65D 87/24; B65D 25/18
[58] Field of Search ............. 220/9 LG, 9D, 10, 15; 62/272, 273, 275, 276, 45, 54; 165/133, 136; 52/404, 407

[56] References Cited
UNITED STATES PATENTS

| | | | |
|---|---|---|---|
| 1,896,046 | 1/1933 | Farrington ........................ | 62/273 X |
| 2,959,318 | 11/1960 | Clark et al........................... | 220/15 |
| 3,196,622 | 7/1965 | Smith et al................... | 220/9 LG X |
| 3,206,057 | 9/1965 | Prew...................................... | 220/15 |
| 3,362,559 | 1/1968 | Kohring............................. | 220/9 LG |
| 3,389,823 | 6/1968 | Finzi et al........................ | 220/9 LG |
| 3,791,164 | 2/1974 | Laverman..................... | 220/9 LG X |
| 3,820,492 | 9/1974 | Yamamoto................... | 220/9 LG X |

Primary Examiner—William I. Price
Assistant Examiner—Stephen Marcus
Attorney, Agent, or Firm—Sughrue, Rothwell, Mion, Zinn & Macpeak

[57] ABSTRACT

Thermal insulation material is affixed to the outer surface of the inner sidewall of a double walled storage tank but spaced from the outer sidewall to form a gaseous space therebetween and a blackish wall on the radially outer face of said insulating material faces said tank outer sidewall.

7 Claims, 6 Drawing Figures

INSULATION FOR DOUBLE WALLED CRYOGENIC STORAGE TANK

BACKGROUND OF THE INVENTION

1. Field of the Invention

This invention relates to the insulation of tanks adapted for storage of liquid cryogens, and more particularly to the sidewall insulation of dome-roofed cylindrical tanks in this service.

2. Description of the Prior Art

Storing non-condensing gases, such as natural gas, oxygen, ethylene gas, in liquid state at cryogenic temperature region has for long met industrial storage requirements. Normally, these gases are stored at nearly atmospheric pressure, and accordingly the storing temperatures are extremely low; hydrogen at −252°C, oxygen at −183°C, natural gas −162°C, while the ambient temperature is usually around 0°C or higher.

The difference between the storing temperature of a liquified gas and the ambient temperature usually results in vaporization of the stored liquified gas, and the heat loss is always disadvantageous.

Therefore, one of designers biggest interests is how to minimize the vaporization loss. Usually, a cryogenic tank is designed to be of doublewall type, consisting of a metallic inner tank, an outer tank with dome roof, and cold insulation therebetween.

The inner tank is usually made of nine percent nickel steel, austenitic stainless steel or aluminium alloy, and usually consists of a cylindrical wall, which has sufficient strength to bear at least liquid head pressure. Further, the tank has a flat bottom, and a dome roof or a flat deck suspended from the outer roof.

The outer tank is usually made of carbon steel or concrete, and usually consists of a cylindrical wall, a flat bottom and a dome roof.

The insulation of the cryogenic tank is divided into three parts; the roof insulation, the bottom insulation, and the sidewall insulation. The roof insulating material is often fibrous, cellular, or granular. The roof insulation is installed between the inner roof and the outer roof, or on the roof deck when a suspended deck is employed.

The bottom insulating material is usually perlite mortar blocks, cellular glass blocks, or wooden panels. The bottom insulation must have enough strength to bear the weight of the inner tank, cryogenic liquid, etc.

The sidewall insulating material is in most cases granular perlite, which is filled in the gap between the outer cylindrical wall and inner cylindrical wall, and, sometimes, instead of granular perlite, a fibrous material, such as glass wool is used.

Perlite insulation is thought to be the most economical because granular perlite is cheap in comparison with other insulating materials and because granular perlite filling is rather easy which results in short-time installation.

However, in a cryogenic tank, a well-known phenomenon of perlite compaction is caused by the falling-down of perlite due to the differences in thermal and mechanical behavior between the inner tank and the outer tank during cool-down, operation, and warm-up. The perlite compaction results in lateral pressures acting on the tank walls, that is, internal pressure on the outer tank wall and external pressure on the inner tank wall, the latter of which might cause a disastrous collapse of the tank.

In order to minimize the lateral pressures, some measures have been devised and applied with good success so far. For example, the resilient blankets are installed on the tank walls to absorb the behavior differences between the inner and outer tanks, and to prevent the falling-down of perlite to some degree.

However, it is still evident that there can be no fundamental countermeasures to the perlite compaction, so far as perlite is filled in all of the gap between the inner and outer tanks.

When a fibrous material, such as glass wool, is filled in the gap between the inner and outer tanks, or when a cellular material, such as urethane foam, is filled in as well, the sidewall insulation can be installed in such a way that there occur no heavy lateral pressures on the tank walls. Differing from the perlite insulation, the cellular insulating material does not fall down in spite of the behavior differences between the inner and outer tanks.

However, in this case, perfect installation of the insulation is hardly possible, and in almost all cases imperfections of insulation will occur. Voids in materials, channels between materials are typical of these imperfections.

Once the imperfections appear, a certain amount of heat is transferred from the outer tank wall to the inner tank wall through them, and accordingly spots of the outer tank wall might be cooled down to such a critical low temperature where the outer tank material breaks due to low temperature brittleness.

SUMMARY OF THE INVENTION

According to this invention, there is provided a sidewall insulation system for a double-walled cylindrical crogenic tank, which gives structural stability to the tank and insulation system it self, eliminates chances of cold spot occurrence, while still maintaining good insulating effects.

The invention will be illustrated and explained further in connection with the attached drawings.

DESCRIPTION OF PREFERRED EMBODIMENTS

Figure 3:
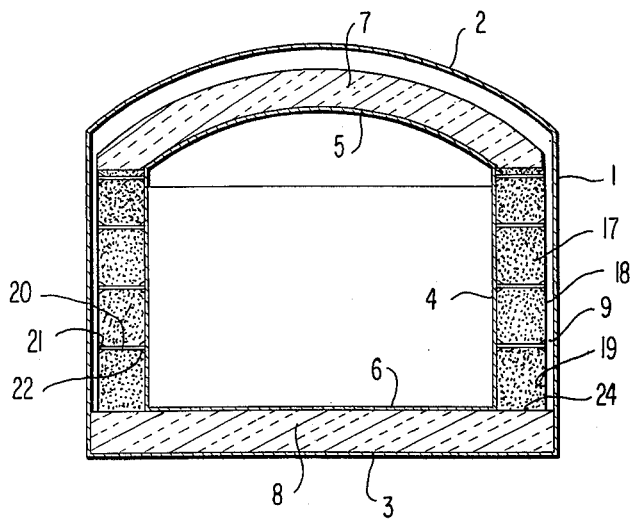
FIG. 3 is a sectional elevational view of another embodiment of the sidewall tank insulation of this invention.
Figure 6:
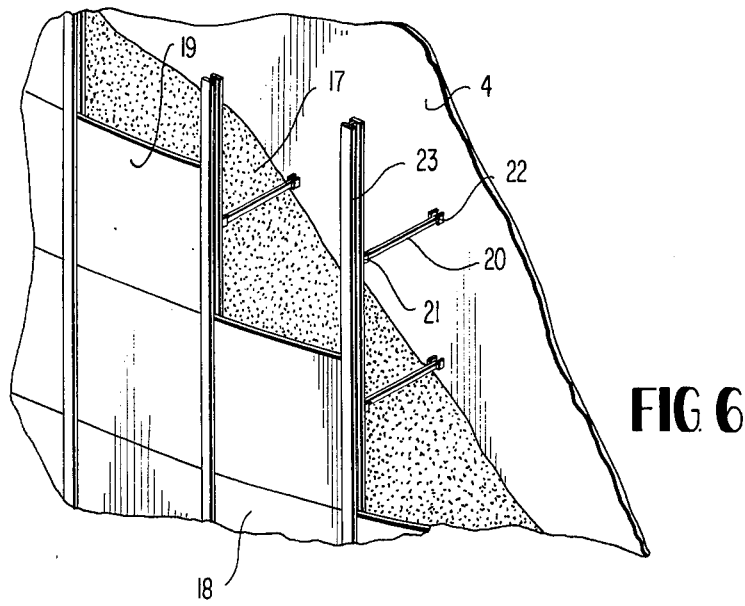
FIG. 6 is a perspective view, partially broken away, of the detailed installation of granular insulation employing the present invention.

In all of the figures, like reference numerals designate like elements. An outer tank has a cylindrical sidewall 1, a dome-shaped roof 2, and a flat bottom 3. The inner tank has a cylindrical sidewall 4, an inner tank roof 5, and at 6 is an inner tank flat bottom. The roof insulation is shown at 7, the bottom insulation at 8. A gaseous space is identified at 9. 10 is fibrous insulating material, and 11 is a surface sealing sheet. 12 comprises a vertical anti-convective barrier, and 13 a horizontal anti-convective barrier. 14 comprises cellular insulating material, and 15 the black surface finish. Contraction joints 16 lie between cells. In FIGS. 3 and 6, granular insulating material is designated at 17 and at 18 is black surface finish of the rigid partition plates 19. Plates 19 are coupled by way of supports 20 via pin junctures 21 and 22, juncture 21 associated with vertical column 23. In FIG. 3, bottom plate 24 underlies the granular insulating material 17.

Figure 1:
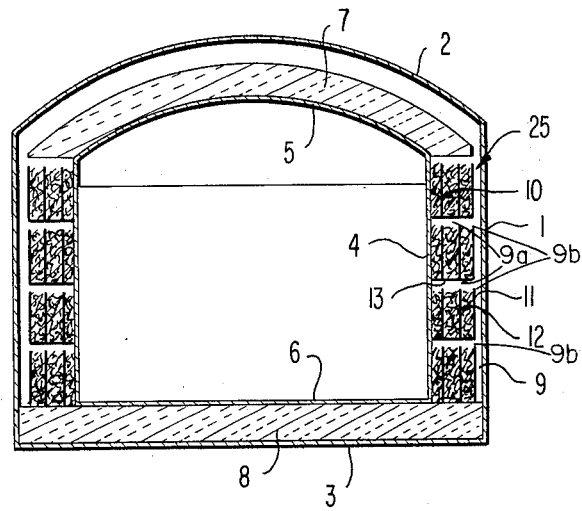
FIG. 1 is a vertical sectional view of a sidewall tank insulation of this invention in one form.
Figure 4:
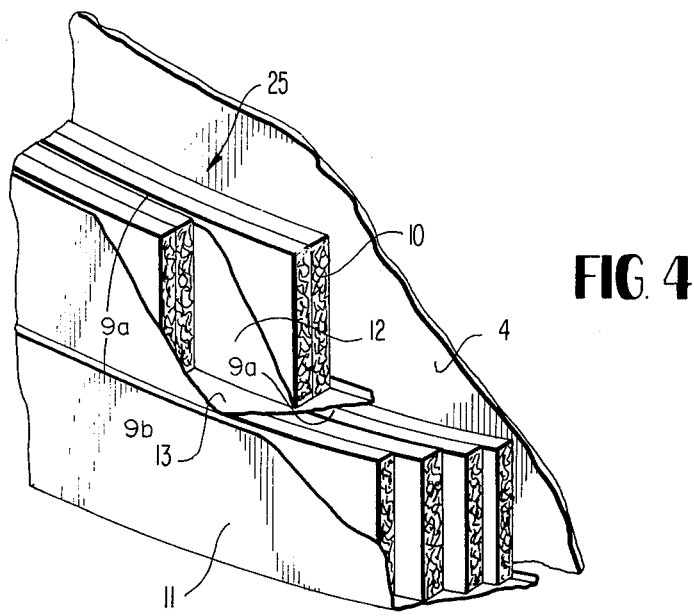
FIG. 4 is a perspective view, partially broken away, of the detailed installation of the fibrous insulation scheme of FIG. 1.

In FIGS. 1 and 4, the cryogenic tank is of the double wall type, consisting of a cylindrical outer tank with dome roof 2 and a cylindrical inner tank 4 with dome roof or flat deck 6, which roof 5 and bottom 6 are insulated with conventional insulating materials. The roof 5 is insulated with granular or fibrous or cellular material, and the bottom 6 is insulated with cellular or wooden or concrete materials which have sufficient strengths to bear the inner tank and liquid weights; normally 10 to 50 Kg/cm² of allowable compressive strength for the annular part and 2 to 5 Kg/cm² for the part within the annular part.

The tank is erected on a foundation suitably protected from soilfreezing and is anchored stably.

The sidewall insulation consists of an insulating layer indicated generally at 25 on the outer surface of the inner tank sidewall 4, and a gaseous space 9.

The insulating layer is installed uniformly, closely as far as possible so that chances of cold path occurrence are minimized, and so that chances of voids in insulation are minimized, because any existence of cold paths or voids causes heat convection losses, and such decreases insulating effects.

The insulating layer 25 consists of layers of fibrous insulating material 10, surface sealing sheets 11 colored black, vertical anti-convective barriers 12, and horizontal anti-convective barriers 13.

The fibrous material layers 10 are installed by suitable mechanical methods on the inner tank sidewall 4, with fiber direction horizontal so as to restrict the internal gas convection as little as possible. The pack density of the fibrous material is recommended to be 16 Kg/m³ or larger and the thermal conductivity to be 0.03 Kcal/m²h or smaller.

The surface sealing sheets 11 are spread over the surface of the fibrous insulating layer, which prevent the mutual convection of gas between the insulating layer and the gaseous space 9. Once the said mutual convection of gas is allowed between them, the heat loss will increase to a great degree.

The top end of each surface sealing sheet 11 is provided with a horizontal gap 9b, which allows a slight transfer of gas so as to adjust the difference between the gas pressure in the gaseous space 9 and the gas pressure in the insulating material 10, the latter of which changes rapidly especially when the tank is cooled down at the start-up operation.

In spite of the said horizontal gaps 9b in the surface sealing sheets 11, the said mutual convection of gas is restricted to a small degree, for the surface sealing sheets are kept gas-tight. The surface sealing sheets 11 are colored black, which accelerates the radiative heat transfer across the gaseous space 9 from the outer tank sidewall 1 to the insulating layer, and, on the contrary, diminishes the convective heat transfer.

The inner surface of the outer tank sidewall 1 should be colored black or blackish.

Simply speaking, the radiative heat transfer qr between the facing planes is given as, $q_r = 4.88/1/0.9 + 1/0.9 - 1 \; T_1/100^{\;4} - T_2/100^{\;4}$ (Kcal/m²h)

Supposing that the radiative absorptivities of the both planes be 0.9, then; $qr = 3.99 \; T1/100^{\;4} - T2/100^{\;4}$ (Kcal/m²h) where; T1 and T2 are the absolute temperatures (°K) of the outer tank sidewall 1 and the sealing sheets 11, respectively.

If both facing planes are polished and their radiative absorptivities are 0.1, the radiative heat transfer qr' will be, $qr' = 0.257 \; T1'/100^{\;4} - T2'/100^{\;4}$ (Kcal/m²h).

Then, as the maximum heat transfer q across the gaseous space 9 by radiation is decided depending on the thermal properties of the insulating layer, (T1 - T2) is much smaller than (T1' - T2').

Thus, by accelerating the radiation across the gaseous space 9, the difference of temperature between the outer tank sidewall 1 and the surface sealing sheets 11 can be made as small as possible, or, in other words, the convection in the gaseous space 9 can be restricted to a small degree, for example, less than 10% of total heat transfer.

This means that there occurs little temperature gradient in the gaseous space 9 in any vertical plane and that the lower parts of the outer tank side wall 1 gather no dew nor frost on its outer surface.

The layers of fibrous insulating material 10 are provided with vertical and/or horizontal anti-convective barriers 12, 13, which restrain internal gas convection in the fibrous material 10.

The heat transfer, or the heat loss in other words, will be increased by 10 to 20 percent in case of 60,000 m³ LNG tank designed with the boil-off rate of 0.1 percent per day, unless any anti-convective barrier is provided.

The upper end of each vertical anti-convective barrier 12 is provided with a horizontal gap 9a, which allows a slight transfer of gas so as to adjust the pressure difference between inside and outside of the barrier 12 itself.

The anti-convective barriers 12, 13 also can relax the temperature gradients in vertical planes in the fibrous insulating material 10, which will be, for example, 0°C at the top and −100°C or lower at the bottom, if there is no barrier, in the case of the before-mentioned 60,000 m³ LNG tank.

The insulating layer is designed to follow the contracting changes of the inner tank sidewall 4 when cooled down. Therefore, if it is adequately installed, any defects will not be enlarged after cool-down, but rather slight channels or small voids will be eliminated after cool-down.

The gaseous space 9 separates the inner tank and the outer tank from each other. This helps in the safe tank design, for no load is transmitted from the outer tank to the inner tank.

No external lateral pressure, except a slight gas pressure, works on the inner tank sidewall 4 and roof 5, and there is no possibility of the inner tank buckling.

The existence of the gaseous space 9 is very effective in eliminating cold spots on the outer tank sidewall 1 and roof 2, for cold spots, if any, on the surface of the insulating layer can be diffused across the gaseous space 9. The gaseous space 9 is filled with dry inert gas or with vaporized gas of the stored liquid.

In case of fires in the neighboring area, the gaseous space works as a temporary barrier to protect the insulating layer.

The gaseous space can also be utilized as a working space when installing the insulating layer. Good installation and inspection will be possible.

Figure 2:
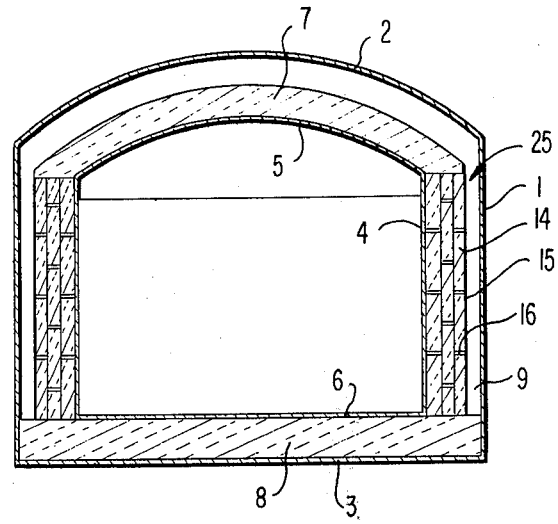
FIG. 2 is a sectional view of another form of the sidewall tank insulation of this invention.
Figure 5:
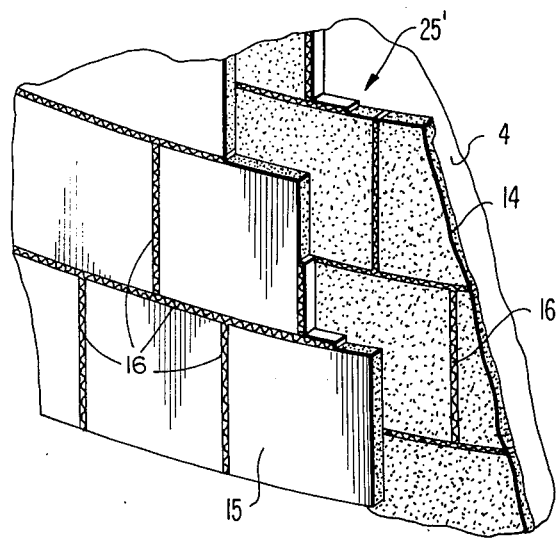
FIG. 5 is a perspective view, partially broken away, of another form of the invention showing detailed installation of the cellular insulation.

In FIGS. 2 and 5, the tank is of the double wall type, and the roof, bottom insulations are as explained in FIGS. 1 and 4. The sidewall insulation 25' consists of an insulating layer on the outer surface of the inner tank sidewall 4 and a gaseous space 9. The insulating layer is installed uniformly. The insulating layer consists of blocks of cellular insulating material 14, black surface finish 15 and contraction joints 16. The cellular material blocks are installed, with resilient contraction joints 16 both vertically and horizontally inserted, by suitable mechanical methods on the inner tank sidewall 4.

The contraction joints 15 are designed to absorb the vertical and horizontal thermal contraction of the inner tank sidewall 4 when cooled-down. The contraction joints can be of fibrous material.

The cellular insulating material blocks are designed to follow the contracting movements, both vertical and horizontal, of the inner tank side wall 4 when cooled down. Therefore, if they are suitably installed, any defects will not be enlarged after cool-down, but rather slight defects such as channels at joints, if any, will be eliminated after cool-down.

The surface 15 of the insulating layer is colored black, which accelerates the radiative heat transfer across the gaseous space 9 from the outer tank sidewall 1 to the insulating layer, and diminishes the convective heat transfer, to lessen the temperature gradient in the gaseous space 9 in any vertical plane and to eliminate any gathering of dew and frost on the outer tank sidewall.

The gaseous space 9 separates the inner tank and the outer tank from each other, and exerts the effects as explained in FIGS. 1 and 4.

In FIGS. 3 and 6, the tank is of the double wall type, and the roof and bottom insulation are as explained in FIGS. 1 and 4.

The sidewall insulation consists of an insulating layer on the outer surface of the inner tank sidewall 4 and a gaseous space 9. The insulating layer consists of granular insulating material 17, rigid partition plates 19 with black surface finish 18, supports 20 and vertical columns 23 for the rigid partition plates, and the other accessories. The granular material 17 is filled in the space, the width of which is kept constant by the inner tank sidewall 4 and the rigid partition plates 19 with the help of the supports 20 and the columns 23. Thus, as the fallingdown of the granular material 17 can be prevented, almost no compaction of the granular material 17 will occur, in spite of the difference of behaviour of the inner and outer tanks.

The bottom end of the insulating layer is provided with circumferential bottom plates 24. The bottom plates 24, provided with circumferential contraction allowance, are fastened to the inner tank so that, when the inner tank is cooled down, they follow the thermal contraction of the inner tank.

The bottom plates 24, which are mechanically connected with the rigid partition plates 19, carry the whole insulating layer radially along with the inner tank when cooled down.

The vertical columns 23 and the rigid partition plates 19 are not clamped to each other, but they are designed to allow slight mutual movements so that, when the inner tank is cooled, the thermal contractions of the inner tank sidewall, both in vertical and circumferential directions can be absorbed. The plates are shown in FIG. 6 as vertically slidable within columns 23 which are H-shaped in horizontal cross-section.

The horizontal supports 20 are attached at intervals and hold the vertical columns 23 at a constant distance from the inner tank sidewall 4. The supports 20 are made of rigid materials of low thermal conductivity. The supports are connected with the vertical columns 23 and with the inner tank sidewall 4 by pin junctures 21 and 22.

The outer surfaces 18 of the rigid partition plates 19 are colored black, which accelerate the radiative heat transfer across the gaseous space 9 from the outer tank sidewall 1 to the insulating layer, and diminish the convective heat transfer, to lessen the temperature gradient in the gaseous space 9 in any vertical plane and to eliminate the gathering of dew and frost on the outer tank sidewall 1.

The gaseous space 9 separates the inner tank and the outer tank from each other, and exerts the effects as explained in FIGS. 1 and 4.

If the insulating layer is installed on the inner surface of the outer tank sidewall 1, differing from this invention, and the gaseous space 9 is located between the inner tank sidewall 4 and the insulating layer, the insulating layer will be influenced by ambient conditions, such as wind, sunshine, fire, and possibilities of voids or channels in the insulating material near the inner surface will grow, for the outer tank sidewall 1 does not contract while the inner surface of the insulating layer thermally contracts after cool-down.

Furthermore, in this case, it will lead to an enormous heat loss and an enormous evaporation loss of the stored liquid to send out or in the low temperature gas or warm gas, respectively, from or to the cryogenic gaseous space for adjusting the gas pressure between the inner and outer tanks.

In this invention, as the gaseous space 9 is located just inside the outer tank sidewall 1, where the gas temperature is always warm, the adjusting of the gas pressure does not cause any heat loss or any evaporation loss of the stored liquid.

The bottom of the gaseous space 9 may be filled with granular insulating material in order to prevent the annular part of the outer tank bottom 3 from getting cooled to sub-zero temperature, in precaution of abnormal troubles of breaks of the insulating layer.

The top of the gaseous space 9 may be closed by any suitable horizontal partition in order to restrict the gas convection.

This invention can be applied, not only in the above-said double wall type tanks with dome roof or with flat deck, but also in spherical double shell tanks, or in spheroidal double shell tanks, or in any other double shell tanks.

In this invention, the outer tank and the inner tank are quite independent from each other, except for supporting parts such as the tank bottom 3, 6, and except for nozzle connections, and therefore structural stability is assured.

In this invention, the gaseous space 9 is located between the outer tank sidewall 1 and the insulating layer installed on the outer surface of the inner tank sidewall 4. This exerts good effects thermally and structurally as above explained.

In this invention, the outer surface of the insulating layer is colored black or blackish. This exerts good thermal effects as above-explained.

What is claimed is:

1. In a cryogenic storage tank or the like comprising spaced, sealed inner and outer tank sidewalls with insulation between respective sidewalls, the improvement wherein: said sidewall insulation comprises thermal insulation material on the outer surface of the inner tank sidewall and a gaseous space between said outer tank sidewall and said insulating material, and means forming a blackish surface on said insulating material facing the spaced outer tank sidewall.

2. The tank as claimed in claim 1, wherein said thermal insulation comprises at least one layer of cellular insulating blocks having black surfaces thereon facing said outer sidewall.

3. The tank as claimed in claim 1, wherein said thermal insulation comprises rigid partition plates spaced from said inner tank sidewall with the blackish outer surface of said plates facing said outer tank sidewall and said granular material being captured between said partition plates and said inner tank sidewall.

4. The tank as claimed in claim 3, wherein a plurality of circumferentially spaced, vertical H-shaped columns extends vertically upwards between said inner and outer tank sidewalls and said rigid partition plates are slidably mounted within the channels formed by said columns in vertically stacked arrays to permit said rigid partition plates to shift vertically in response to temperature changes.

5. The tank as claimed in claim 1, wherein said thermal insulation comprises at least one layer of fibrous insulation material and said means forming said blackish surface comprises black surface sealing sheet material on the surface of said fibrous insulation material facing said outer tank sidewall.

6. The tank as claimed in claim 5, wherein said tanks are cylindrical and said thermal insulation comprises multiple radial and axial layers separated by vertical and horizontal anticonvection barriers.

7. The tank as claimed in claim 5, wherein said thermal insulation material comprises vertically stacked blocks of fibrous material in multiple layers between said inner and outer tanks, and said tank further comprises vertical anti-conductive sheet barriers between said layers of blocks and horizontal anticonductive sheet barriers between vertically stacked blocks, said blocks and said vertical barriers are separated vertically, and black surface sealing sheet material is in the form of vertically spaced sheets conforming in height to said blocks and said vertical anti-convection sheet barriers to form vertically spaced, horizontal gaps leading from the vertical gap existing between the outer wall and said black surface sealing sheet material to said inner tank sidewall to permit limited transfer of gas to prevent gas pressure variance between said inner and outer tank sidewalls when the tank is cooled down during start-up operation.

* * * * *